United States Patent Office 3,534,642
Patented Oct. 20, 1970

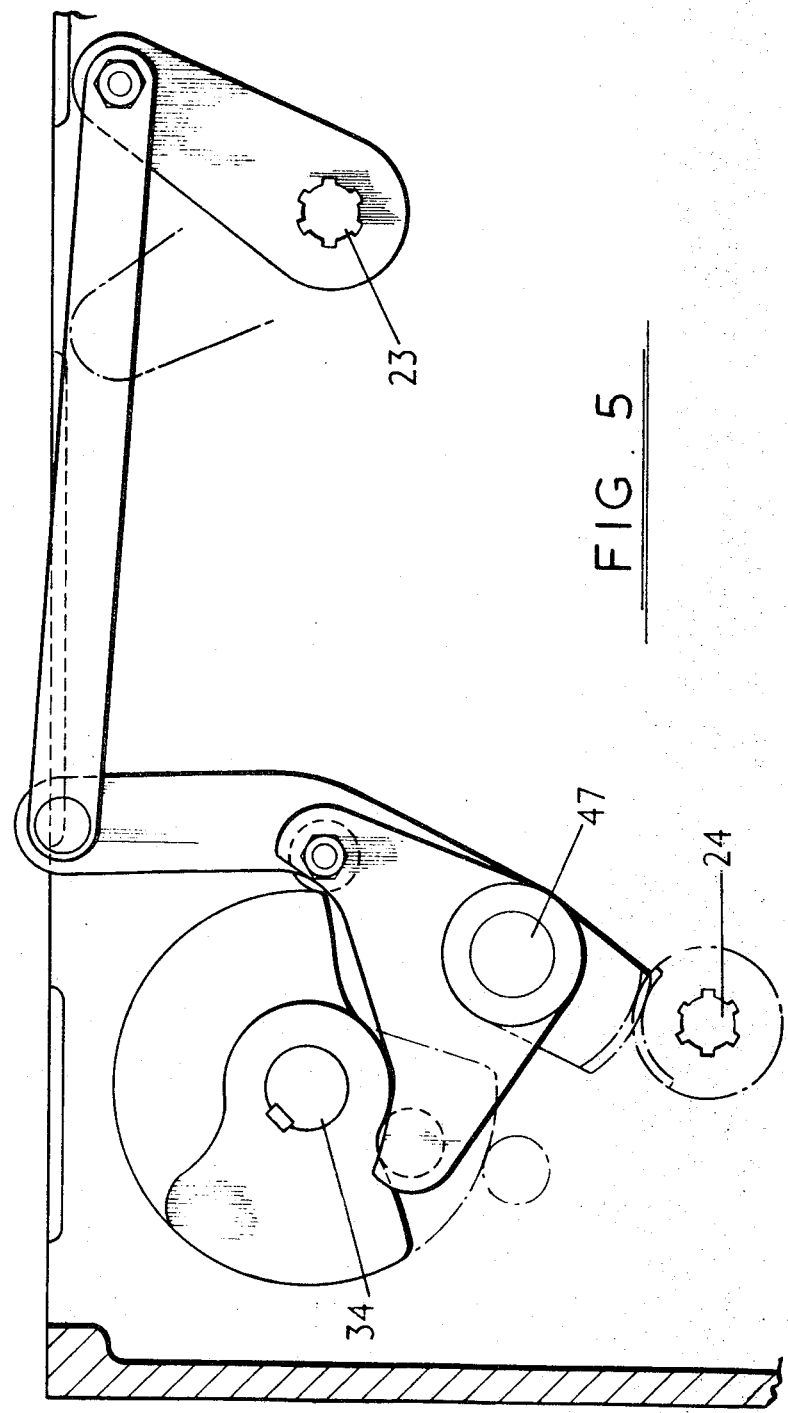

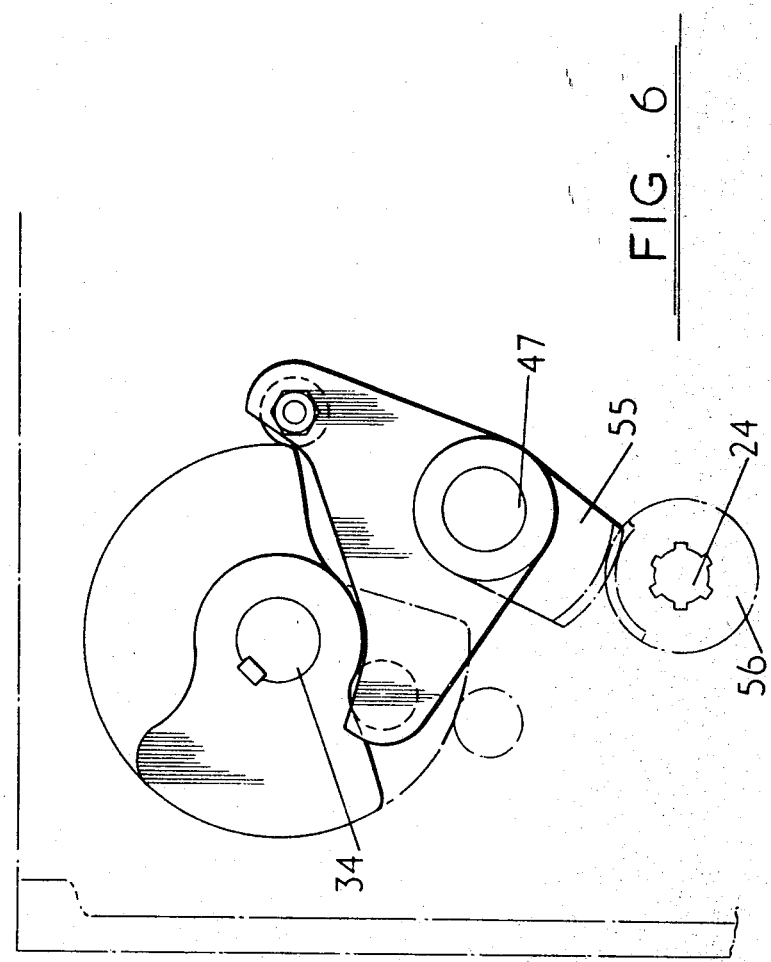

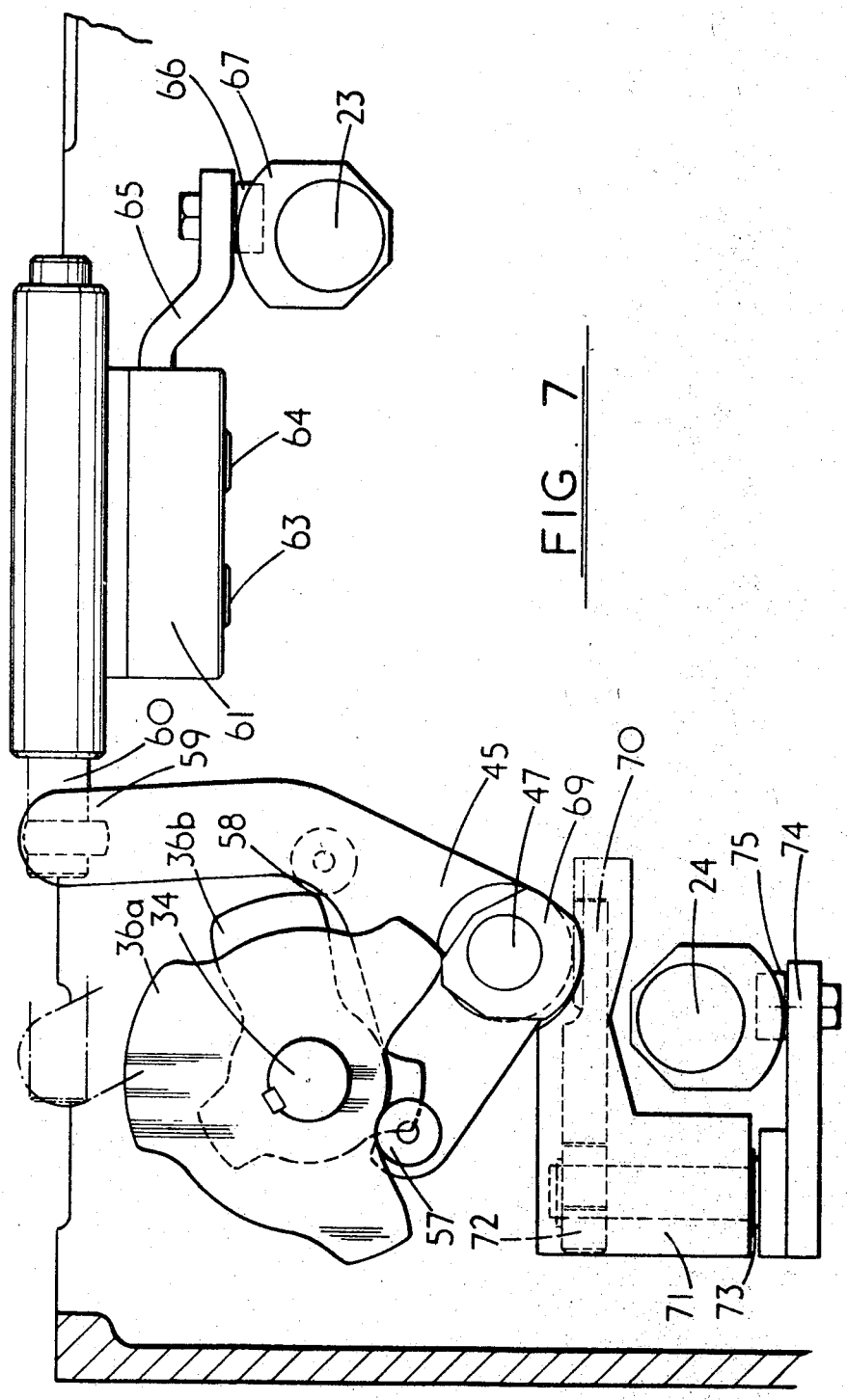

3,534,642
COMPONENT LOADING DEVICES FOR
AUTOMATIC MACHINE TOOLS
Dennis Horobin, Kenilworth, England, assignor to Wickman Machine Tool Sales Limited, Coventry, England
Filed July 25, 1967, Ser. No. 655,937
Claims priority, application Great Britain, July 25, 1966, 33,325/66
Int. Cl. B23b 13/02
U.S. Cl. 82—2.5     5 Claims

ABSTRACT OF THE DISCLOSURE

An automatic machine tool in which a component loading and unloading device includes a pair of arms movable on the headstock lengthwise and angularly with respect to the work spindle of the machine, and mechanism for operating the arms in timed sequence with the remainder of the machine to perform loading and unloading of components.

BACKGROUND OF THE INVENTION

This invention relates to devices for loading and for unloading components from automatic machine tools, and the object of the invention is to provide such a device in a convenient form.

SUMMARY OF THE INVENTION

In accordance with the present invention, a device for loading and/or unloading components to an automatic machine tool comprising loading and unloading arms, component gripping means for each of the arms, means mounting each of said arms on the headstock for pivotal movement and longitudinal movement relative to the work spindle, a first pair of cam discs mounted for rotation in the headstock, movement transmitting means between one cam disc of said first pair and the loading arm for effecting pivotal movement of the loading arm in one direction and the other disc for movement in the opposite direction, a second pair of cam discs mounted for rotation in the headstock, movement transmitting means between one cam disc of said second pair and the unloading arm for effecting pivotal movement of the unloading arm in one direction and the other disc for movement in the opposite direction, a third pair of cam discs mounted for rotation in the headstock, movement transmitting means between one cam of the third pair and each of said arms for effecting longitudinal movement of said arms and the other cam for effecting longitudinal movement in the opposite direction, and means for rotating said pairs of cam discs to control the movements of the arms in timed sequence with an operating cycle of the machine.

The invention will now be described with reference to the accompanying drawings in which.

Figure 3:
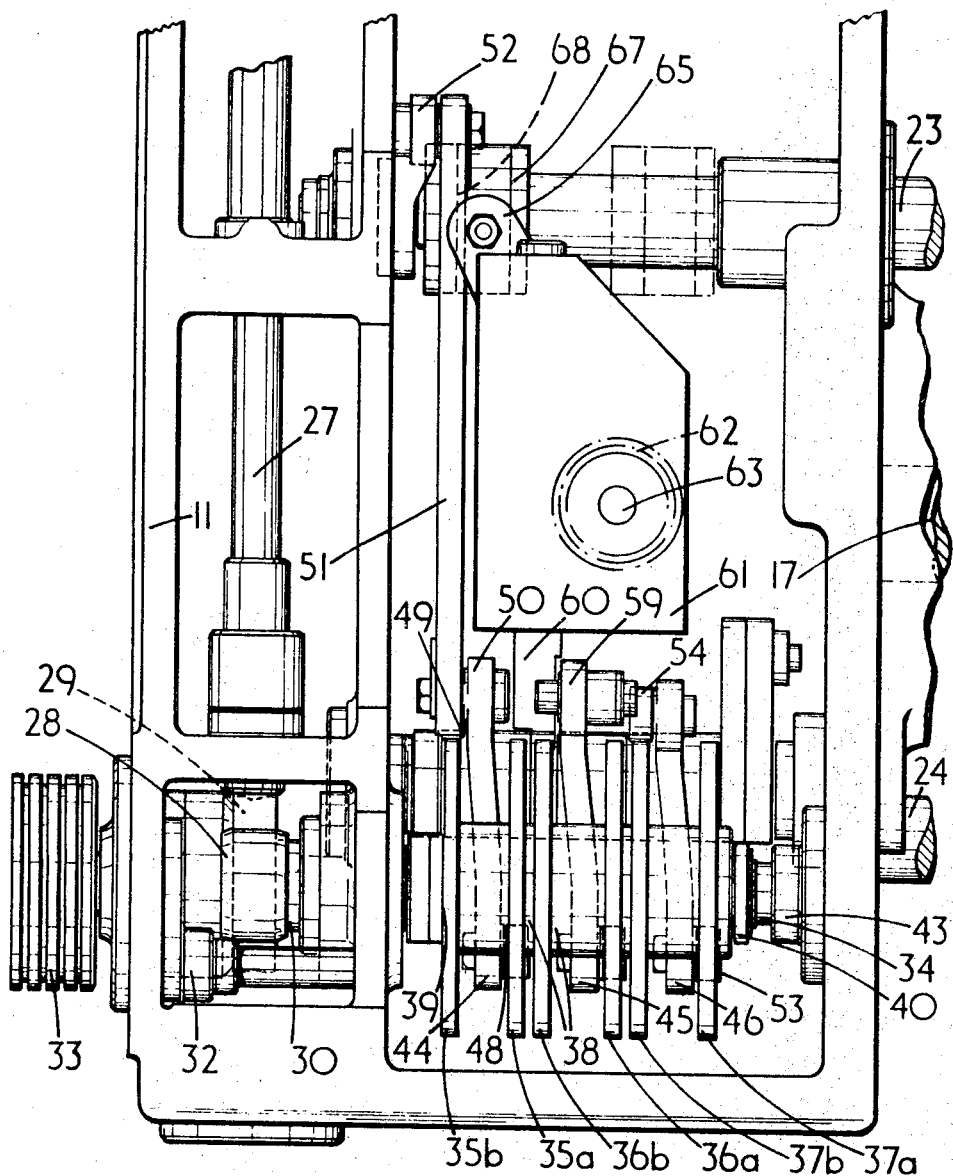
Figure 4:
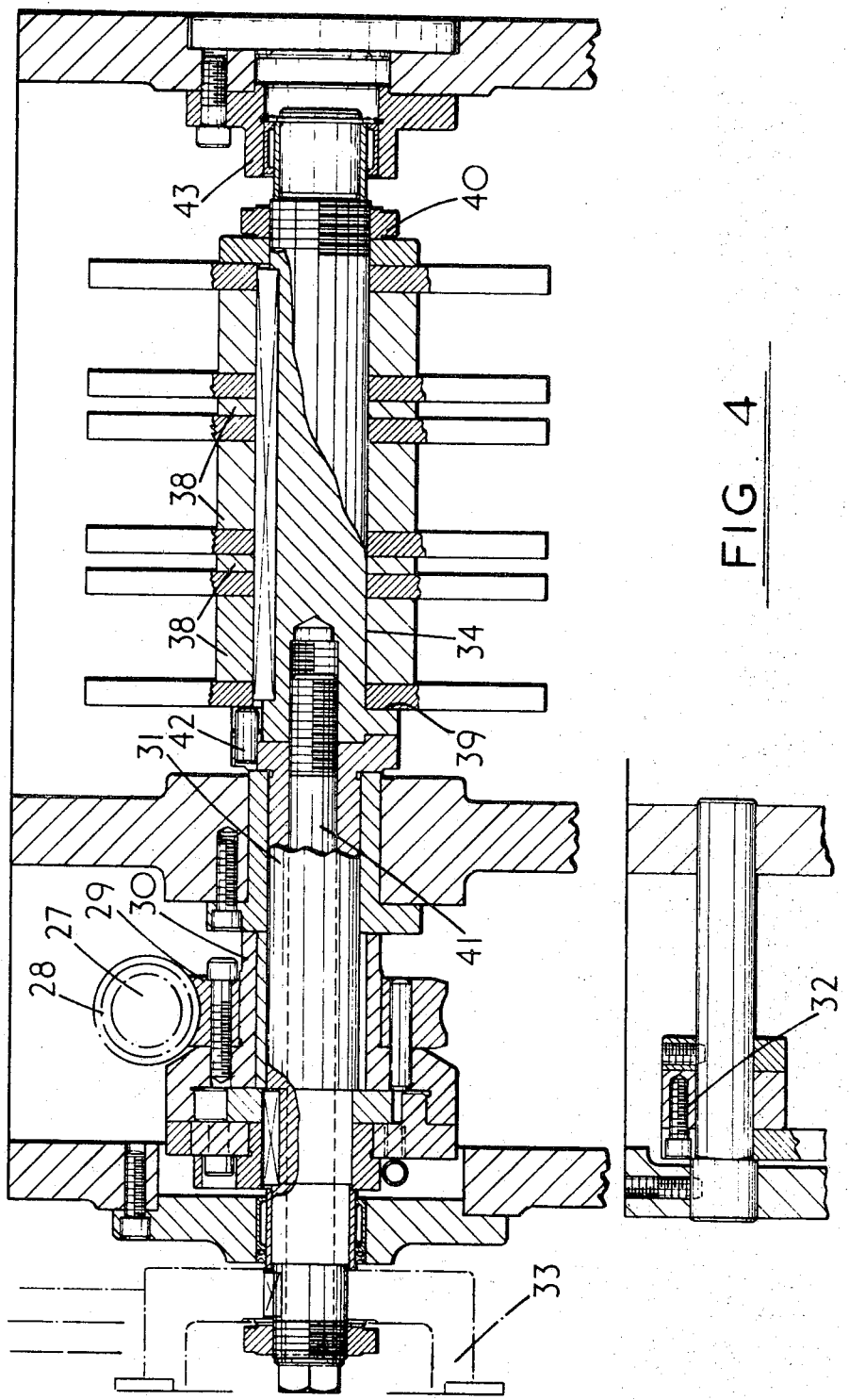

FIG. 3 is a plan view of the headstock of the machine on an enlarged scale, with the top removed to reveal the internal parts, FIG. 4 is a cross-sectional view through the cam shaft assembly of the headstock mechanism, FIG. 5 is a view of mechanism for operating the loading arm, FIG. 6 is a view of mechanism for operating the unloading arm, and FIG. 7 is a view of further mechanism for operating both the arms.

Figure 1:
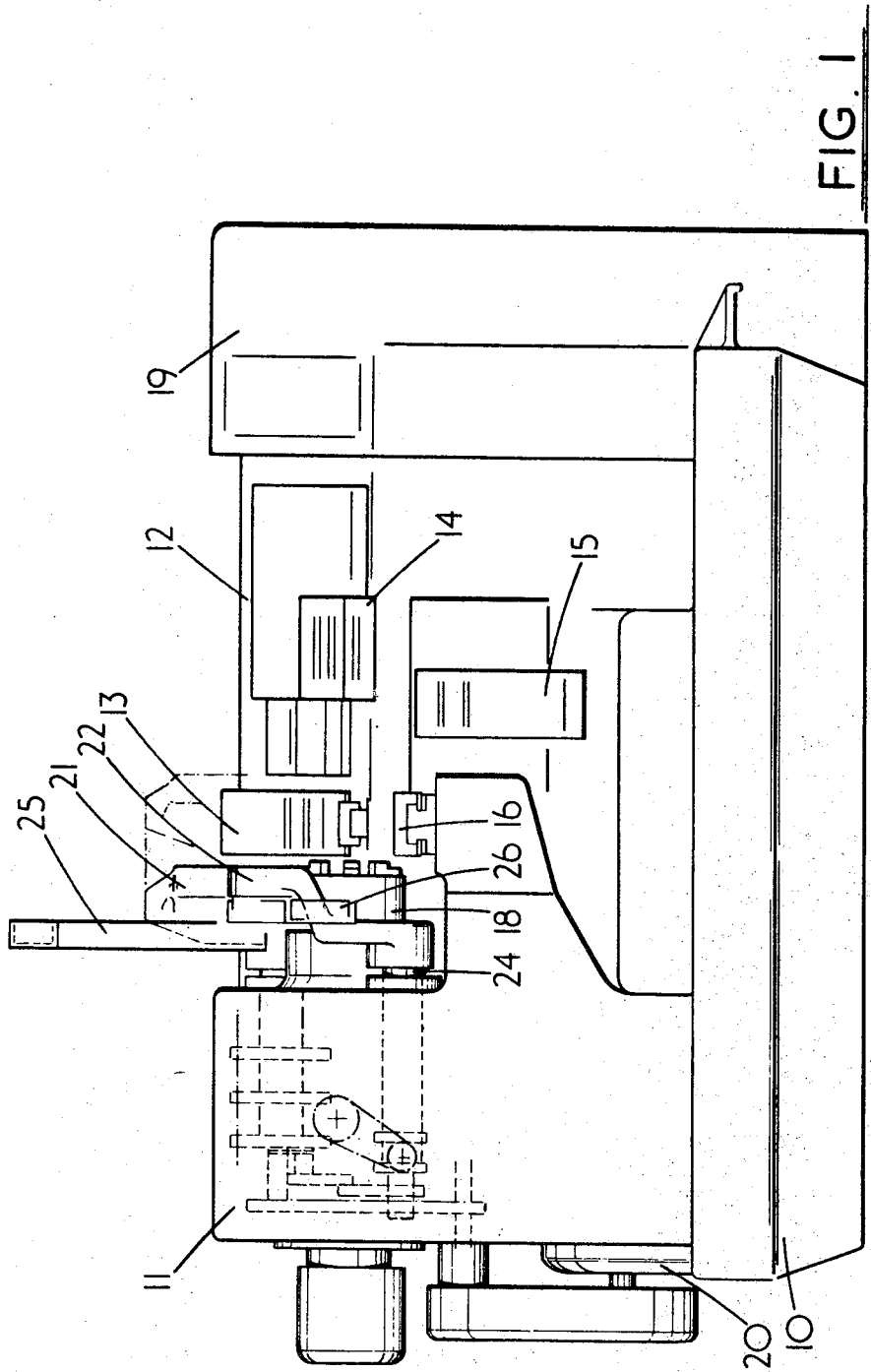
FIG. 1 is a side elevation view of the machine incorporating the invention.
Figure 2:
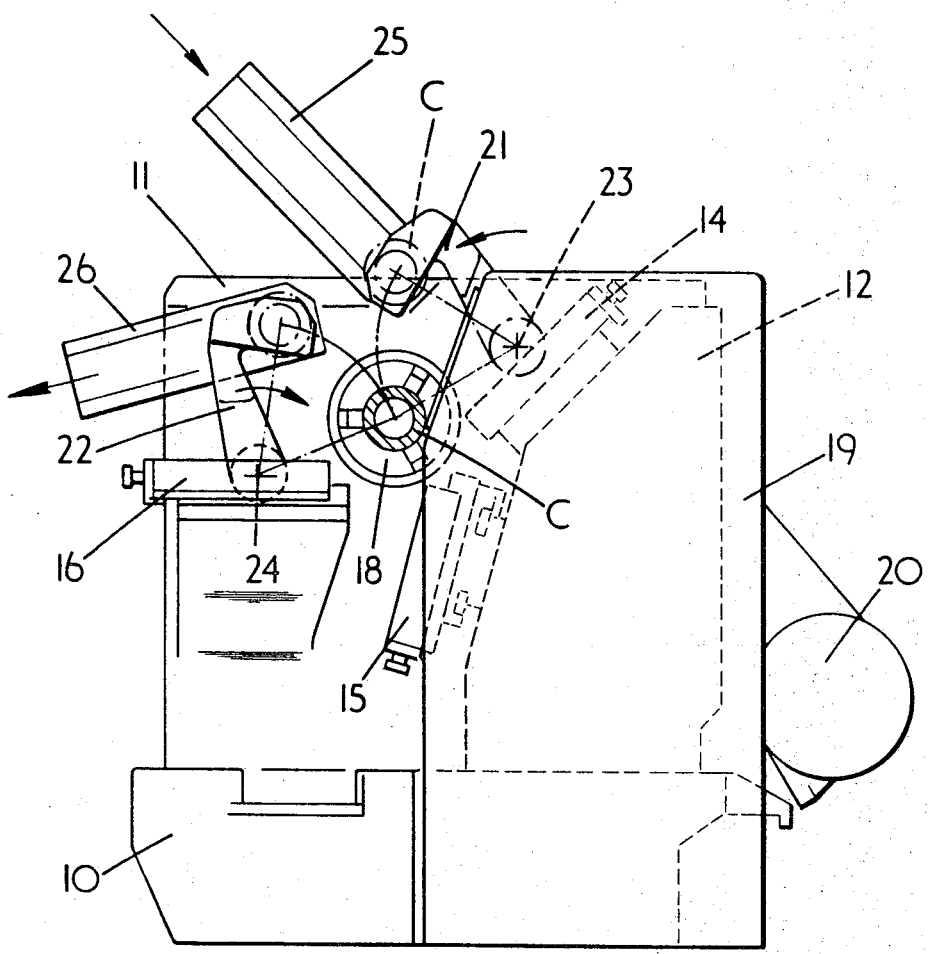
FIG. 2 is an end elevation view of the machine.

The machine tool to which this invention is applied is an automatic single spindle lathe having a base 10 on which is mounted a headstock 11, and a bed 12 of the rear or inclined type. The bed carries, in this example, three tool slides 13, 14, 15 and a further tool slide 16 is mounted upon an extension of the headstock 11. The tool slide 16 is horizontal as illustrated in FIG. 2, but can alternatively be positioned at an angle at 15° if required. In the headstock 11 is mounted the single work spindle 17 (shown in FIG. 3) of the machine, and this carries a chuck 18 in which components (one of which is indicated at C in FIG. 2), to be machined are held. The chuck has associated automatic means for gripping components, this automatic means being not illustrated and being of known form.

At the opposite end of the machine from the headstock 11 is a housing 19 containing electrical control gear for actuating the machine and mechanical control mechanisms (not shown) for operating the tool slides 13, 14, 15, 16 are contained within the rear bed 12 of the machine. The machine is driven by an electric motor 20.

Mounted in the headstock 11 are two arms 21, 22 referred to respectively as the loading and unloading arms, these being mounted on the same face of the headstock 11 as the chuck 18 on respective shafts 23, 24 arranged with their axes parallel to the work spindle 17 of the machine. The arms 21, 22 carry respective component gripping devices (not illustrated), these being described and claimed in the Complete Specification of our copending British patent application No. 33,326/66.

The arms 21, 22 are capable of movement longitudinally of their shaft axes as well as angular movement about those axes. The loading arm 21 can occupy a position illustrated in FIG. 2 in which its component gripping device is capable of gripping a component C in the discharge end of a chute 25, can move angularly and then longitudinally towards the chuck 18, to a second position in which the component C can be gripped by the chuck 18.

The unloading arm 22 can occupy a position in which it can grip a component C after release thereof from the chuck 18, and after longitudinal and then angular movement, the unloading arm 22 occupies a position illustrated in FIG. 2 in which the component C is deposited in the entry portion of a discharge chute, 26. The chutes 25 and 26 are secured at appropriate angles respectively upon the headstock 11 of the machine.

It will be observed from FIG. 2 that the arcs of angular travel of the arms 21 and 22 are such that these arms are at all times substantially spaced from the tool slides so that they interfere with the access of the cutting tools used on the machine as little as possible.

The tool slides are mounted beside and below the work spindle and the arms are mounted above it.

Within the headstock 11 there is provided means for operating the arms 21, 22, this means being illustrated in FIGS. 3, 4, 6 and 7 of the drawings.

Within the headstock 11, mounted transversely of the axis of the work spindle 17, is a drive shaft 27 connected through suitable transmission (not shown) with the electric motor 20 of the machine. At one end of this drive shaft 27 is a worm 28 meshing with a wheel 29. The wheel 29 is mounted on a collar 30 surrounding a hollow shaft 31 forming part of a cam shaft assembly. There is an electrical trip mechanism illustrated diagrammatically at 32 whereby the wheel 29 and sleeve 30 can be coupled to the shaft 31 to rotate it. In association with the trip mechanism there is a trip drum 33 secured to the shaft 31 at the end of the cam shaft assembly, micro-switches (not shown) being arranged to engage detents on the trip drum to control the actuation of the component chuck on the work spindle and the releasing and gripping devices on the arms in timed relation to the operation of the cam shaft assembly. This interconnection of the loading and unloading arms with the controls for the tool slides ensures that the arms work in correct timed sequence with the remainder of the machine.

The cam shaft assembly is arranged to rotate once upon actuation of the trip mechanism 32 and then stop, an electrical signal being provided for initiating this from control gear contained in the housing 19.

The opposite end of the cam shaft assembly comprises a shaft portion 34 to which are keyed three pairs of disc cams 35, 36, 37, the members of each pair being designated by suffixes a and b respectively. These cams are separated by spacers 38 and all the cams and spacers are held against a shoulder 39 on the shaft portion 34 by a screwed locking ring 40.

The shaft portion 34 is secured to the hollow shaft 31 by means of a screwed rod 41 passing through that hollow shaft, there being, at the adjacent ends of the shaft portion 34 and the hollow shaft 31, respective integral flanges in which are disposed a least one dowel pin 42. The opposite end of the shaft portions 34 is engaged in a bearing 43 in the headstock casting.

The shaft portion 34 together with the pair of cams 35, 36 and 37 can be removed by withdrawal of the screwed rod 41 from engagement with the shaft portion 34 and then sliding the shaft portion 34 further into the bearing 43 to release the dowel 42. The shaft portion can now be removed by angular tilting. Once this assembly is removed, the cams can be detached and replaced by others having profiles appropriate to the work required of the machine.

FIGS. 5, 6 and 7 illustrate respective mechanisms for performing movements of the loading and unloading levers and in each of these views the positions of the shafts 23 and 24 are shown.

Each pair of cams is arranged to perform movements of the shafts, one cam of each pair serving to perform movements in one direction and the other performing the return movement. Thus associated with the pairs of cams 35, 36, 37 are respective followers 44, 45 and 46 all mounted upon a follower shaft 47.

As illustrated in FIG. 5 the cams 35a and 35b are engaged by respective rollers 48, 49 carried on the follower 44, the latter being extended to form an arm 50 to which is pivotally connected one end of a link 51. The opposite end of the link 51 is connected to a lever 52 which is splined onto the shaft 23 of the loading arm 21.

As the shaft portion 34 is rotated once, the cams 35a and 35b cause the follower 44 to rock thus transmitting angular movement to the loading arm shaft 23 in one direction and after a short dwell in the opposite direction to the initial position.

FIG. 6 shows the mechanism for performing angular movement of the unloading arm shaft 24. This comprises the follower 46 engaging the two cams 37a and 37b through respective rollers 53, 54 respectively. The follower 46 has an extension 55 formed with arcuate gear teeth which engage with similarly cut gear teeth on the circumference of a sleeve 56 splined onto the unloading arm shaft 24. The toothed portions of the part 55 and sleeve 56 form respective gear segments whereby angular movement of the follower 46, as a result of cam rotation, causes corresponding angular movement of the shaft 24.

FIG. 7 illustrates the mechanisms, operated by the cams 36, for imparting longitudinal movement to both the shafts 23 and 24. The follower 45 carries two rollers 57, 58 engaging the cams 36a and 36b respectively. An extension of the follower 45 forms an arm 59 pivotally connected to a rod 60 which passes through a box 61 and within this box the rod 60 is formed with teeth to provide a rack. As seen in FIG 3 the box contains a pinion 62 which, though this is not shown, engages with the rack. The pinion 62 is mounted upon a shaft 63 geared to another shaft 64 which carries an arm 65.

At the free end of the arm 65 is a roller 66 engaging between two shoulders 67, 68 formed on the loading arm shaft 23. With this arrangement the shaft 23 can be moved lengthwise from its initial position by lengthwise, angular and then further opposite lengthwise movement, to a second position and is then returned by a reversed sequence of movements to the initial position with one revolution of the cams 36a and 36b.

Mounted upon the shaft 47 and non-rotatable with respect to the follower 45 is a member 69 on which is formed a gear segment engageable with teeth on a rack bar 70 slidably mounted in a body 71. The body 71 contains a pinion 72 connected to a spindle 73 projecting out of the body 71 and having connected to it a lever 74. The free end of this lever 74 carries a roller 75 engaging between a pair of shoulders on the shaft 24 of the unloading arm, similar to those on the shaft 23. Rotation of the cams 36a and 36b through one revolution cause the shaft 24, through this mechanism, to be moved from an initial position, by lengthwise, angular and then further opposite lengthwise movement to a second position, and then returned by a reversed sequence of movements to the initial position.

It is to be understood that the loading and unloading device as described can be applied, with suitable modifications, to other forms of machine tool, such as to multi-spindle lathes.

The machine tool may only be provided with one arm which either performs loading operations or unloading operations. When the arm is used to load components, these may be unloaded by knocking them into a suitably placed receptacle at the conclusion of the machining operation or operations on them. Unloading by an arm may be required when bar stock is being machined, each component being separated from the bar stock as the arm gripping device arrives to accept it and transfer it to a discharge chute.

Having thus described my invention what I claim as new and desire to secure by Letters Patent is:

1. In an automatic machine tool having a headstock and a work spindle, a device for loading and unloading components with respect to the work spindle, said device comprising loading and unloading arms, component gripping means for each of the arms, means mounting each of said arms on the headstock for pivotal movement and longitudinal movement relative to the work spindle, a first pair of disc cams mounted for rotation in the headstock, movement transmitting means between one cam of the first pair and the loading arm for effecting pivotal movement of the loading arm in one direction and the other disc for pivotal movement in the opposite direction, a second pair of disc cams mounted for rotation in the headstock, movement transmitting means between one cam of said second pair and the unloading arm for effecting pivotal movement of the unloading arm in one direction and the other cam for pivotal movement in the opposite direction, a third pair of disc cams mounted for rotation in the headstock, movement transmitting means between one cam of said third pair and each of said arms for effecting longitudinal movement of said arms in one direction and the other cam for longitudinal movement in the opposite direction, and means to impart rotation to said pairs of disc cams for controlling the movements of said arms in time sequence with an operating cycle of the machine.

2. An automatic machine tool as claimed in claim 1 in which the work spindle is provided with a chuck and said loading arm is movable from a first position, to receive a component, by pivotal and longitudinal movement to a second position, to allow engagement of the component in the chuck, and the unloading arm is movable from a first position, to grip a component upon release thereof from the chuck, and by longitudinal and pivotal movement to a second position to discharge the component.

3. The automatic machine tool as claimed in claim 1 including a single cam shaft detachably mounted on said headstock. and said pair of disc cams being mounted on said cam shaft.

4. The automatic machine tool as claimed in claim 1 including a single spindle rear bed type and tool slides mounted thereon.

5. The automatic machine tool as claimed in claim 4 in which the tool slides are mounted below and beside the work spindle and said loading and unloading arms are disposed above said work spindle.

References Cited

UNITED STATES PATENTS

| | | | |
|---|---|---|---|
| 522,930 | 7/1894 | Church | 82—2.5 XR |
| 1,933,226 | 10/1933 | Smith et al. | 82—2.7 |
| 1,945,662 | 2/1934 | Smith | 82—2.7 |
| 2,973,532 | 3/1961 | Bosl et al. | 82—2.5 XR |
| 3,226,886 | 1/1966 | Seidel | 82—2.7 XR |

FOREIGN PATENTS 695,520  8/1940  Germany.

LEONIDAS VLACHOS, Primary Examiner

U.S. Cl. X.R.

82—2.7